G. HOAG.
Combined Scale and Coin Tester.
No. 216,184. Patented June 3, 1879.
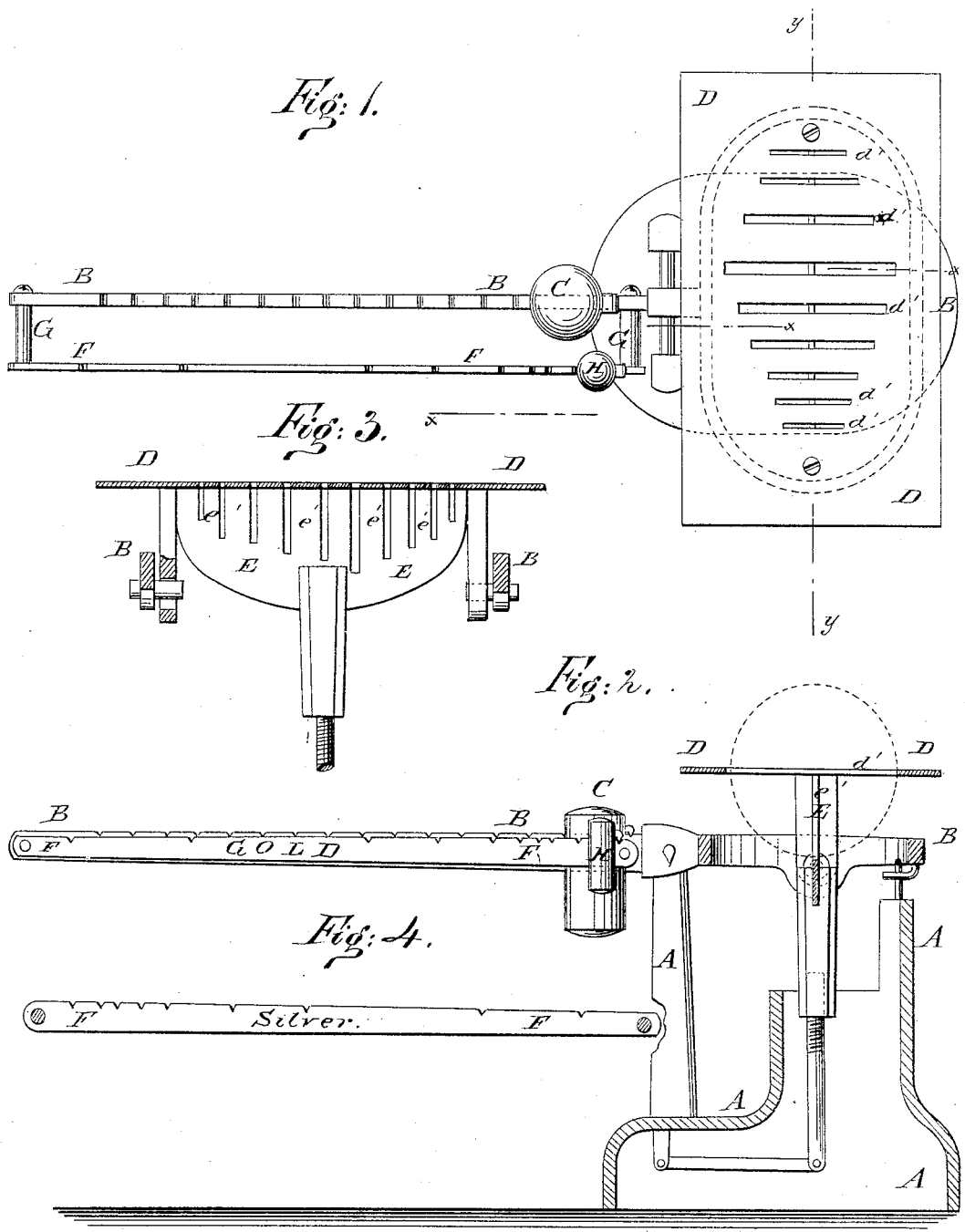

UNITED STATES PATENT OFFICE.

GEORGE HOAG, OF NEW YORK, N. Y.

IMPROVEMENT IN COMBINED SCALE AND COIN-TESTER.

Specification forming part of Letters Patent No. 216,184, dated June 3, 1879; application filed March 27, 1879.

*To all whom it may concern:*

Be it known that I, GEORGE HOAG, of the city, county, and State of New York, have invented a new and Improved Combined Scale and Coin-Tester, of which the following is a specification.

Figure 1 is a top view of my improved device. Fig. 2 is a side view of the same, partly in section, through the broken line $x\ x$, Fig. 1. Fig. 3 is a detailed cross-section of the same, taken through the line $y\ y$, Fig. 1. Fig. 4 is a detail view of the reverse side of the coin-scale beam.

Similar letters of reference indicate corresponding parts.

The object of this invention is to furnish scales for weighing letters and other mail-matter which shall be provided with appliances for testing the weight, size, and thickness of coins, and which at the same time shall be simple in construction and convenient and reliable in use.

The invention consists in the combination of the slotted vertical plate with the slotted scale-pan of a scales, for testing the size and thickness of gold and silver coins; and in the combination of the second beam and its weight with the main beam and its weight, and with the scale-pan provided with the slots, and the vertical plate provided with the slots for testing the weight, the size, and the thickness of gold and silver coins, as hereinafter fully described.

A represents the standard, B the main beam, C the weight, and D the pan or platform, of the scales, which parts are connected together and balanced in the usual way.

The scale-pan D is made flat, and has a series of slots, $d'$, formed through it to receive the different gold and silver coins, the slots toward one end of the pan D being intended for the gold coins, and those toward the other end being intended for the silver coins. The slots $d'$ are made of a length and breadth equal to the diameter and thickness of the various coins, so as to test their size and thickness.

To the central part of the lower side of the pan D is attached the upper edge of a vertical plate, E, which has slots $e'$ formed in it directly beneath the slots $d'$ of the said pan D. The slots $e'$ are made of a breadth equal to the breadth of the slots $d'$, and of a depth equal to half the length of the said slots $d'$, so that the coins will be held with their diameters in line with the scale-pan D.

F is the beam which is used for testing the weight of the coins, and which is connected at its ends with the main beam B by bolts, screws, or rivets G. The beam F is provided with a weight, H, for balancing the coins. In the upper edge of the beam F are formed notches at the various points where the weight H should stand to balance the various coins.

The notches for the gold coins should be marked upon one side of the beam F, and the notches for the silver coins should be marked upon the other side of the said beam, with the value of the coins to which they belong.

The slots $d'$ in the scale-pan D may also be marked with the value of the coins to which they belong.

With this construction the device, while serving as a scale for weighing letters and other mail-matter, also serves as a test for the size, the thickness, and the weight of gold and silver coins.

Having thus fully described my invention, I claim as new and desire to secure by Letters Patent—

The combination of the scale-pan D, consisting of a horizontal plate, provided with slots $d'$, and the vertical plate E, provided with the slots $e'$, and the supplemental scale-beam F, secured by the bolts G to the scale-beam B, so as to be parallel with the said beam, and provided with the weight H, with the main beam B and its weight C, substantially as and for the purpose set forth.

GEORGE HOAG.

Witnesses:
JAMES T. GRAHAM,
C. SEDGWICK.